(12) United States Patent
Wolf

(10) Patent No.: US 8,727,784 B1
(45) Date of Patent: May 20, 2014

(54) SPORTS BOARD DRILL TRAINING APPARATUS AND METHOD THEREFORE

(76) Inventor: Jeffrey D. Wolf, Scottsdale, AZ (US)

(*) Notice: Subject to any disclaimer, the term of this patent is extended or adjusted under 35 U.S.C. 154(b) by 369 days.

(21) Appl. No.: 12/987,843

(22) Filed: Jan. 10, 2011

Related U.S. Application Data

(63) Continuation-in-part of application No. 12/005,966, filed on Dec. 28, 2007, now abandoned.

(51) Int. Cl.
- *G09B 19/00* (2006.01)
- *A63B 69/00* (2006.01)
- *G09B 9/00* (2006.01)

(52) U.S. Cl.
USPC .......................................................... 434/248

(58) Field of Classification Search
USPC ................................................. 434/247, 248
See application file for complete search history.

(56) References Cited

U.S. PATENT DOCUMENTS

| | | | |
|---|---|---|---|
| 4,004,805 A | 1/1977 | Chen et al. | |
| 4,006,565 A | 2/1977 | Thompson et al. | |
| 4,304,404 A * | 12/1981 | Pundt | 463/4 |
| 4,422,647 A | 12/1983 | Wilson et al. | |
| 4,702,475 A | 10/1987 | Elstein et al. | |
| 5,263,866 A * | 11/1993 | Campbell | 434/416 |
| 5,489,886 A | 2/1996 | Wexler et al. | |
| 5,827,072 A * | 10/1998 | Neufer et al. | 434/416 |
| 6,280,352 B1 * | 8/2001 | Coffeen et al. | 473/447 |
| 2006/0240916 A1 * | 10/2006 | Montie et al. | 473/447 |
| 2006/0287140 A1 | 12/2006 | Brandt et al. | |
| 2007/0238080 A1 * | 10/2007 | Lynch | 434/247 |
| 2009/0117525 A1 * | 5/2009 | Bavaro et al. | 434/247 |
| 2012/0322587 A1 * | 12/2012 | Duke | 473/450 |

\* cited by examiner

*Primary Examiner* — Kesha Frisby
(74) *Attorney, Agent, or Firm* — Adam R. Stephenson, Ltd.

(57) ABSTRACT

A sports board training apparatus. Implementations may include a front surface and a rear surface, the front surface including a mock board layout resembling a basketball court. A plurality of lights may be mounted on the locations on the mock board layout corresponding with a plurality of shot locations. A timing clock may be mounted above the top side of the mock board layout and one or more game control buttons may be mounted on the mock board layout. One or more switches may be mounted on the rear surface. A microprocessor may be included and adapted to actuate each of the plurality of lights, receive inputs from the one or more game control buttons, and to receive signal from the one or more switches. The microprocessor, the plurality of lights, the timing clock, and the one or more switches may be electrically coupled with an electrical power supply.

3 Claims, 7 Drawing Sheets

SPORTS BOARD DRILL TRAINING APPARATUS AND METHOD THEREFORE

CROSS REFERENCE TO RELATED APPLICATIONS

This application is a continuation-in-part application of the earlier U.S. Utility Patent Application to Jeffrey D. Wolf entitled "Sports Board Drill Training Apparatus And Method Therefore," application Ser. No. 12/005,966, filed Dec. 28, 2007, now pending, the disclosure of which is hereby incorporated entirely herein by reference.

BACKGROUND

1. Technical Field

Aspects disclosed herein elates generally to the field of sports training systems and methods.

2. Background Art

At present, athletes ranging from professional level down to the "weekend warrior" casual athlete can improve their playing skills via the use of fundamental drill practice. Fundamental drill practice is used to improve a player's foot work, movement patterns, reactions, speed to a specific location, shot making and other repetitive athletic techniques. In addition, such drills can improve an athlete's cardiovascular endurance. Fundamental drill practice in general involves making repetitive movements over and over again until such movements become second nature.

SUMMARY

Implementations of sports board training apparatuses like those disclosed herein may include a front surface and a rear surface. The front surface may include a mock board layout including a top side and a bottom side. The top side may be adjacent to a basketball hoop indicator and oppose the bottom side. A three point arc (line) may extend from the top side and enclose a key including an arc intersection with the three point arc at a top of the key point. The arc of the key may be centered on the three point arc and may include a free throw line connecting each end of the arc. Two lines may extend from each end of the arc which intersect the top side substantially perpendicularly and the basketball hoop indicator may be substantially centered between the two lines. A plurality of lights may be mounted on the locations on the mock board layout corresponding with a plurality of shot locations. A timing clock may be mounted above the top side of the mock board layout and one or more game control buttons may be mounted on the mock board layout. One or more switches may be mounted on the rear surface of the sports board training apparatus. A microprocessor may be included and adapted to actuate each of the plurality of lights, receive inputs from the one or more game control buttons, and to receive signal from the one or more switches. The microprocessor, the plurality of lights, the timing clock, and the one or more switches may be electrically coupled with an electrical power supply.

Implementations of sports board training apparatuses may include one, all, or any of the following:

One or more game indicator lights may be included and mounted adjacent to the one or more game control buttons and may be electrically coupled with the electrical power supply.

The mock board layout may be coupled to an angle template which includes a plurality of angle lines which are adapted to allow a player using the plurality of angle lines to place one or more cones on a basketball court with a layout corresponding with the mock board layout at aligned locations.

Implementations of sports board training apparatuses like those disclosed in this document may utilize implementations of a method of playing a sports training game. The method may include providing a sports board training apparatus adapted to be placed at a location on a sports venue. The method may also include calculating a baseline time using a microprocessor and one or more switches on a rear surface of the sports board training apparatus where the microprocessor is adapted to calculate the baseline time by counting the number of sections after a player starts the timing clock, completes a baseline run from the sports board training apparatus to a predetermined location on the sports venue and back, and opens one of the one or more switches to send a switch open signal to the microprocessor. The method may also include calculating one or more path times as predetermined percentages of the baseline time using the microprocessor, forming one or more associations between the one or more path times and one or more of a plurality of light indicators on a mock board layout included in the sports board training apparatus, and storing the one or more path times and the one or more associations in memory coupled with the microprocessor. The method may include indicating the selection of one or more games available for play using the sports board training apparatus through one or more game indicators where the one or more games include one or more paths. The method also may include starting a game in response to a player's pressing one of one or more game control buttons, retrieving the one or more path times and the one or more associations from the memory, and providing them to the microprocessor. The method may include illuminating a one or more of the plurality of light indicators on a mock board layout corresponding with a path included in the game selected using the microprocessor enabling a player to execute one or more training exercises associated with that path and providing feedback to the player when the one or more path times corresponding with the one or more paths has elapsed or ended.

Implementations of methods of playing a sports training game may include one, all, or any of the following:

The method may include indicating the time elapsed or remaining since the player pressed the one or more game control buttons to start the game using a timing clock.

The method may also include not indicating the time elapsed or remaining on the timing clock after a predetermined period of time has passed where the predetermined period of time was less than the path time of the path included in the selected game.

Providing feedback to the player may further include informing the player of the difference in time elapsed between a first path included in the game run by the player and second path included in the game run by the player.

Providing feedback to the player may further include informing the player when a path time corresponding to a professional skilled player for the path included in the game has elapsed (ended).

The sports venue may be a basketball court and illuminating one or more of the plurality of light indicators on a mock board layout corresponding with a path included in the game may further include illuminating one or more of the plurality of light indicators on a mock board layout corresponding with a basketball court with a location on the basketball court where a basketball shot should be taken as part of a basketball training game.

Implementations of sports board training apparatuses like those disclosed in this document may utilize implementations of a method of calculating a baseline time for a sports training game. The method may include providing a sports board training apparatus including a microprocessor, one or more switches, and a memory, where the one or more switches and memory are coupled with the microprocessor which further includes a timing clock. The method may include calculating a baseline time using the timing clock by counting the number of seconds from when the microprocessor receives a timing clock start signal to when the microprocessor receives a switch open signal from the one or more switches and calculating one or more path times as predetermined percentages of the baseline time using the microprocessor. The method may also include forming one or more associations between the one or more path times and one or more of a plurality of light indicators on a mock board layout included in the sports board training apparatus. The method may include storing the one or more path times and the one or more associations in memory coupled with the microprocessor and including the stored one or more path times and the stored one or more associations in one or more games adapted to allow a player to execute one or more game training exercises associated with one or more paths associated with the one or more path times.

Implementations of a method of calculating a baseline time for a sports training game may include one, all, or any of the following:

The mock board layout may be of a basketball court and forming one or more associations between the one or more path times and one or more of the plurality of light indicators on the mock board layout may further include associating one or more locations on the basketball court where a basketball shot should be taken as part of a basketball training game with one or more paths associated with the one or more path times.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Implementations will hereinafter be described in conjunction with the appended drawings, where like designations denote like elements, and.

DESCRIPTION

This disclosure, its aspects and implementations, are not limited to the specific components or assembly procedures disclosed herein. Many additional components and assembly procedures known in the art consistent with the intended sports board drill training apparatus and/or assembly procedures for a sports board drill training apparatus will become apparent for use with particular implementations from this disclosure. Accordingly, for example, although particular implementations are disclosed, such implementations and implementing components may comprise any shape, size, style, type, model, version, measurement, concentration, material, quantity, and/or the like as is known in the art for such sports board drill training apparatuses and implementing components, consistent with the intended operation.

Figure 1:
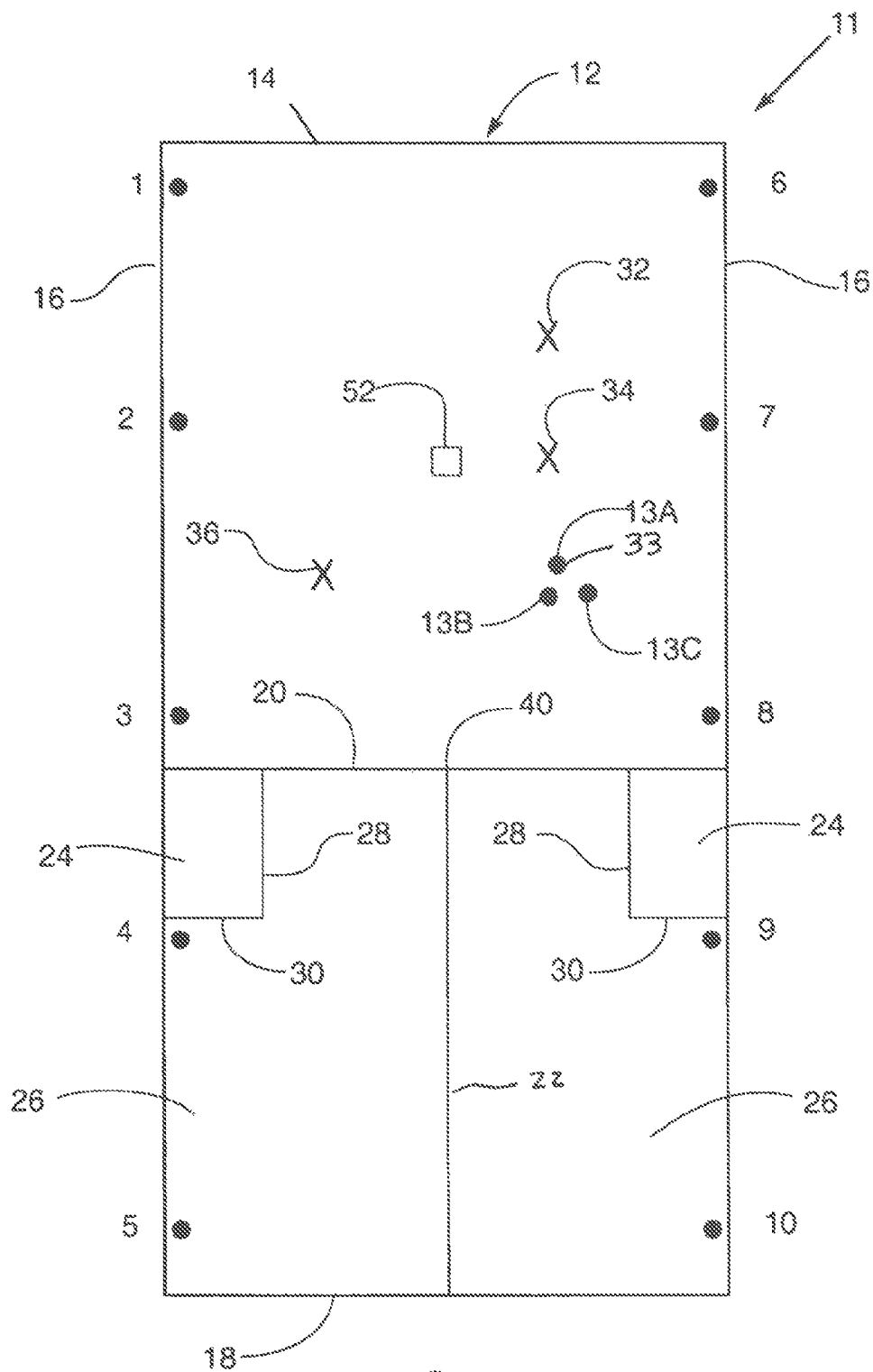
FIG. 1 is front view of a mock board layout implementation which corresponds to a squash court layout.
Figure 2:
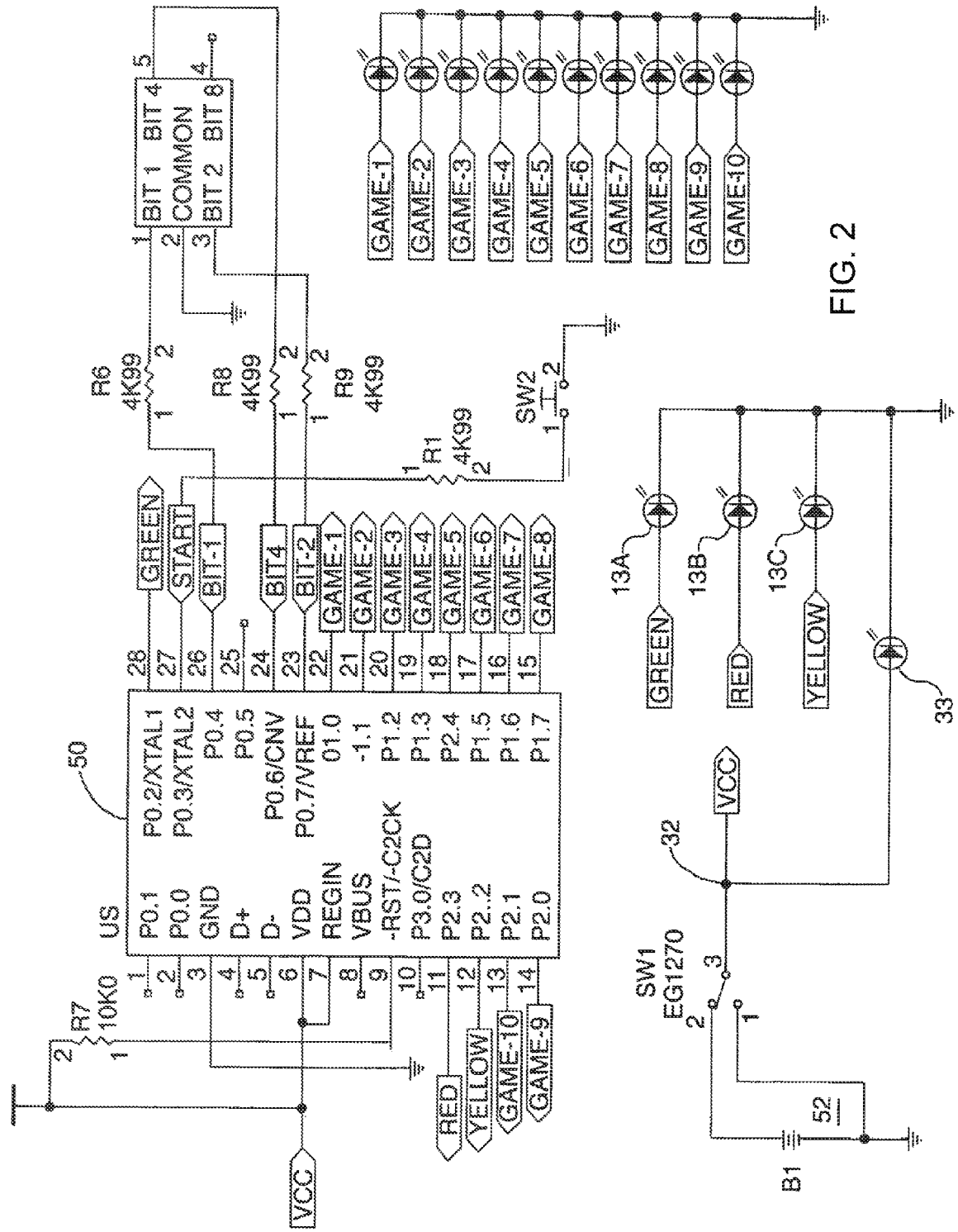
FIG. 2 is a schematic of an electronic circuit board schematic implementation adapted to work with the mock board layout implementation illustrated in FIG. 1.

An implementation of a sports board drill training apparatus (training apparatus) 11 is illustrated in FIGS. 1-2. As illustrated, the training apparatus 11 uses a mock board layout 12 seen in FIG. 1 which corresponds to the layout of a sports venue. In the illustrated example, the layout is a squash court. Those skilled in the art will recognize that the squash court layout is exemplary only and does not limit implementations to that particular configuration. Various implementations may be utilized for any sports venue layout, including, but not limited to, handball courts, tennis courts, basketball courts, baseball diamonds, hockey arenas, or any other suitable milieu.

Squash courts 12 include a front wall 14, two side walls 16 and a rear wall 18. A service line 20 is drawn parallel to the front wall and 18 feet therefrom. A half court line 22 extends rearwardly from service line 20 and parallel to side walls 16 to bisect the rear portion of squash court 12 forming two quarter courts 26. Two boxes 24 are formed in each quarter court 26 bounded by part of the service line 20, part of side walls 16 and by two other lines 28 and 30. Service, or starting a squash round, is initiated from within either of the boxes 24.

In the illustrated example, squash court board 12 is equipped with 10 lights 1, 2, 3, 4, 5, 6, 7, 8, 9 and 10, respectively. In the presently preferred embodiment, lights 1-10 are light emitting diodes (LEDs) but those skilled in the art will recognize that many illumination sources are possible and that various implementations are not limited to that particular light means.

In the squash court example, lights 1-5 arranged along one side wall 16 and lights 6-10 are arranged along the other side wall 16. As those skilled in playing squash will recognize, the location of lights 1-10 correspond to critical points for playing the game.

To use, the player will place squash court board 12 on an actual squash court in any convenient location. The player will activate squash court board 12 by turning it on using on/off switch 32 which, in one implementation, also activates a green power on light 33. The player chooses either a random light mode or a set sequence mode by using game selector switch 34. A speed control button 36 allows a user to select how quickly lights 1-10 will change. Another set of lights 13a, 13b and 13c are respectively, green—start, red—stop and yellow—warning. In particular implementations, the yellow warning light may be replaced with a semicircle series of lights that simulate an opponent's swing.

In the random light mode, the player will not have advance knowledge of which lights will activate. As in a normal squash game, the player will start at a T-location 40 corresponding to the intersection of service line 10 and half court line 22. Once one of lights 1-10 activates, the player will respond by moving to the locations on the actual squash court corresponding to the particular light 1-10 which is activated. The player will make a practice swing imitating ball strike contact and then return to T-location 40. Once at T-location 40, the player will await the next light in the sequence and then repeat the movement, practice swing and return pattern.

In the set sequence mode, the player has advance knowledge of the pattern of lights. This allows a player to concentrate on footwork, movement patterns, athletic techniques, shot making and basic timing. For example, the set pattern mode might actuate lights sequentially from light 1 to light 10 and then reverse the pattern, lighting light 10 to light 1 sequentially. This drill allows a player to concentrate on footwork and movement. The player can change the speed with which the lights activate to allow the player to determine the slower travel destinations. The player can also engage the buzzer either separately or in combination with the lights to provide audio feedback during the drills. This allows a player to identify weak points in that player's game to focus extra training on.

In the random light mode, the lights 1-10 actuate randomly without any set sequence. This mode represents more accurately a game situation and adds the elements of reaction and execution speed to the training. Through use of various implementations of training apparatuses, the player will increase their ability to react with speed and proper form and execution to the spontaneous environment of the random light mode, that player will more likely possess these skills as second nature in a real game environment.

Turning now to FIG. 2, one prototype schematic for game board 11 is shown. A microcontroller 50 is in electrical communication with lights 1-10, 13a-c and 33. Power switch 32 preferably provides electrical power via AA batteries 52 to microcontroller 50 when actuated. In one implementation, microcontroller 50 is a SiLabs C8051F321 having 10 or more (14, for example) separate game configurations available Each game configuration will include tables of time for set sequence or random light modes in which each light 1-10 is turned on for a predetermined period of time governed by a table. For example, in one game, a set sequence mode employs only lights 1, 3, 5, 6, 8 and 10. The lights illuminate in the following sequence 1, 3, 5, 6, 8, 10, 8, 6, 5, 3, 1 with the on/off pattern being:

lights 1, 6 on for 3 seconds, off for 2 seconds;
lights 3, 8 on for 1.5 seconds and off for 2 seconds; and
lights 5, 10 on for 2.7 seconds and off for 2 seconds.

After completion of the cycle, the red light flashes indicating the pattern has been completed. In a random version of the above, the lights do not flash sequentially; microcontroller 50 randomly selects which light goes on but uses the above timing elements for whichever light is selected.

In another game sequence, the set sequence employs all lights which actuate sequentially from 1-10, then 10-1 as previously described. The on/off pattern is:

lights 1, 6 on for 3 seconds, off for 2 seconds;
lights 2, 7 on for 1.7 seconds, off for 2 seconds;
lights 3, 8 on for 1.5 seconds and off for 2 seconds;
lights 4, 9 on for 1.7 seconds and off for 2 seconds; and
lights 5, 10 on for 2.7 seconds and off for 2 seconds.

After completion of the cycle, the red light flashes indicating the pattern has been completed. In a random version of the above, the lights do not flash sequentially; microcontroller 50 randomly selects which light goes on but uses the above timing elements for whichever light is selected.

In another embodiment, a random pattern of 6 light sequences is chosen using lights 3, 4, 5, 8, 9, 10 with the following table:

lights 3, 8 on for 1.2 seconds and off for 2 seconds;
lights 4, 9 on for 1.4 seconds and off for 2 seconds; and
lights 5, 10 on for 1.7 seconds and off for 2 seconds.

In another embodiment, a random pattern of 6 light sequences is chosen using lights 1, 2, 3, 6, 7, 8 with the following table:

lights 1, 6 on for 2 seconds, off for 2 to 2.5 seconds;
lights 2, 7 on for 1.4 seconds and off for 1.5-2 seconds; and
lights 3, 8 on for 1.2 seconds and off for 1.5-2 seconds.

There are a number of variations that are possible. For example, microcontroller 50 is capable of controlling a speaker 52 in which the light numbers 1-10 can be called out either additionally to lighting up, or instead of lighting. In addition, speaker 52 can simply "beep" when to warn when a new light 1-10 is about to be activated, for example, 0.5 seconds before thereby acting as a warning that a change to a new light is about to occur. This feature can be combined with a ready/set lights 13a-c actuating to provide further warning of an impending change. In another implementation, speaker 52 beeps at ball strike position also.

A USB connector (not shown) allows microcontroller 50 to be reprogrammed to add different patterns as desired. A remote control (not shown) can be employed for starting the game, starting a timer, recording reaction time in a game and timing of the device. For example, when a player completes an action, the player actuates the remote control device to signal the microcontroller which records the data for later analysis. By comparing the times to complete various tasks, the player can analyze his or her weak points. In addition, the games included in the training apparatus can be updated or upgraded by allowing the player to receive additional or improved games via email or download which can been be uploaded via a USB flash drive to the training apparatus.

With regard to data storage, such data can be analyzed in two ways. First, a user can simply look at the sum of all reaction times which is automatically calculated using the remote control signal that a movement has been completed. Alternatively, the two (or other number as desired) slowest times for the given lights 1-10 can be provided and evaluated. Personal drills can then be programmed to emphasize those weak areas.

Figure 3:
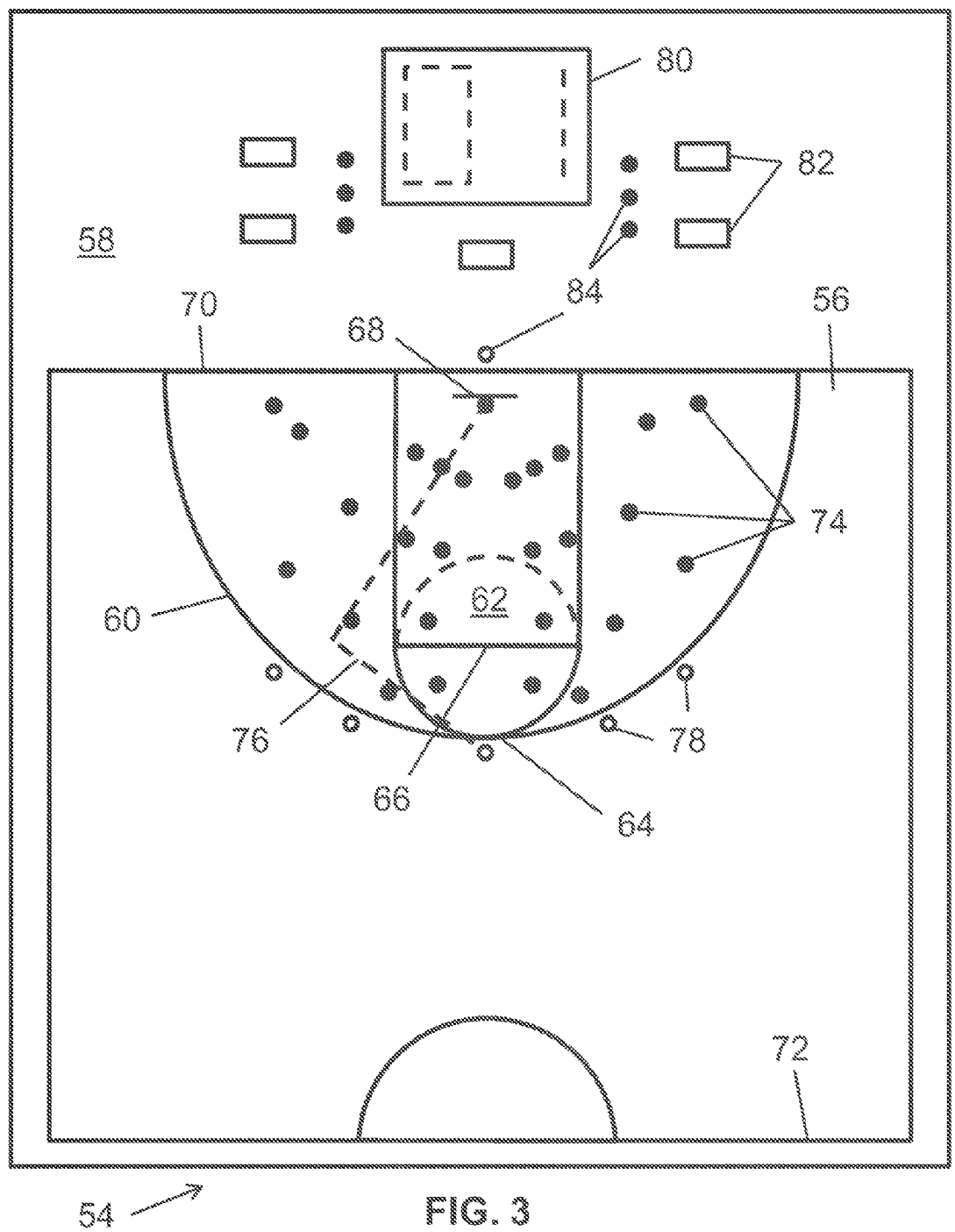
FIG. 3 is a front view of a front surface of a sports board drill training apparatus including a mock board layout implementation which corresponds with a basketball court layout.

Referring to FIG. 3, an implementation of a training apparatus (game board) 54 including mock board layout 56 on its front surface 58 is illustrated. As illustrated, the mock board layout 56 includes various lines that are intended to resemble a particular sports venue. In the implementation illustrated in FIG. 3, the mock board layout 56 is intended to resemble half of a basketball court, with an arc for a three point line 60, key 62, top of the key location 64 where the three point line 60 and the arc associated with the key 62 intersect, and a free throw line 66. A basketball hoop indicator 68 is located adjacent to a top side 70 of the mock board layout 56 which opposes a bottom side 72. Also included in or mounted on the mock board layout 56 are a plurality of lights (light indicators) 74 that correspond, in this implementation, with a plurality of basketball shot locations. While in particular implementations, like those previously described in this document, the lights may be LEDs, in other implementations, the lights may be light indicators represented on a screen forming the mock board layout as lighted areas of the screen. A wide variety of light and light indicator types may be utilized in implementations using the principles disclosed herein.

As illustrated, one or more of the plurality of lights may be included in one or more paths 76, which corresponds to a particular direction or approach taken in the game for which the mock board layout 56 corresponds. In the implementation illustrated in FIG. 3, the path 76 illustrated may correspond to a particular basketball driving lane and the plurality of lights located along the path 76 represent four possible shot locations that could be used by a player following the path 76 during game play. In particular implementations, the mock board layout 56 may also include a plurality of player locations 78, which indicate starting locations for a player.

Depending upon the particular player location 78 that a player is located at, one or more of the paths 76 may or may not be activated or accessible during a particular game. Depending upon the number of players in a particular game, each player may be assigned one of the player locations, or may be free to select any one available.

Implementations of training apparatuses 54 may include a timing clock 80 mounted to, in, or on the front surface 58. Adjacent to the timing clock 80 are one or more game control buttons 82 and one or more game indicator lights 84. The game control buttons 82 may allow a player to access and select one or more games stored in memory contained in the training apparatus 54. The one or more game indicator lights 84 may perform any of a wide variety of functions including, by non-limiting example, indicating which game has been selected, identifying a particular player who is playing in a multi-player game, what type of shot should be taken by a player, whether a game is active or not, indicating a battery storage level, and any other feedback or interaction. The one or more game control buttons 82 may perform a wide variety of functions as well, including, by non-limiting example, starting a game, selecting a game, adding additional players, starting the timing clock, stopping the timing clock, clearing the timing clock, and any other function involving interaction with the memory and/or a microprocessor included in the training apparatus 54. The timing clock 80 may include a plurality of lights such as LEDs configured to display a certain amount of digits, or may be a display in the form of a liquid crystal display (LCD) or any other display type. The timing clock 80 may include circuitry that allows it to track time on its own in response to a timing clock start input received via pressing of a game control button 82, or may merely display the time tracked by a clock included in a microprocessor electrically coupled with the timing clock 80. The timing clock, various lights, microprocessor, and memory, along with any game control buttons, may all be electrically coupled together with an electrical power supply, which may take the form of a battery or device for conditioning power from a wall outlet or other source. Also, the timing clock 80 may, in various implementations, be able to perform and/or replace the one or more game control buttons 82 and one or more game indicators lights 84 through, by non-limiting example, use of touch-sensitive portions on a screen associated with the timing clock 80, display areas on a screen associated with the timing clock, specific patterns of LEDs displayed on the timing clock, or any other method of interacting with a screen and/or array of LEDs and displaying information on a screen and/or array of LEDs.

While in the implementation illustrated in FIG. 3, the various components (lights, buttons, lines, etc.) are discussed and described as discrete components, in other implementations, they may be virtualized, or exist as areas on a screen or display. For example, the lights may be bright locations on a screen, the lines may be displayed on a screen, the timing clock may be an animated portion of a screen, and the buttons may be interactive locations on a touch screen or other human controllable interface. A wide variety of training apparatus implementations are possible using the principles disclosed in this document.

Figure 4:
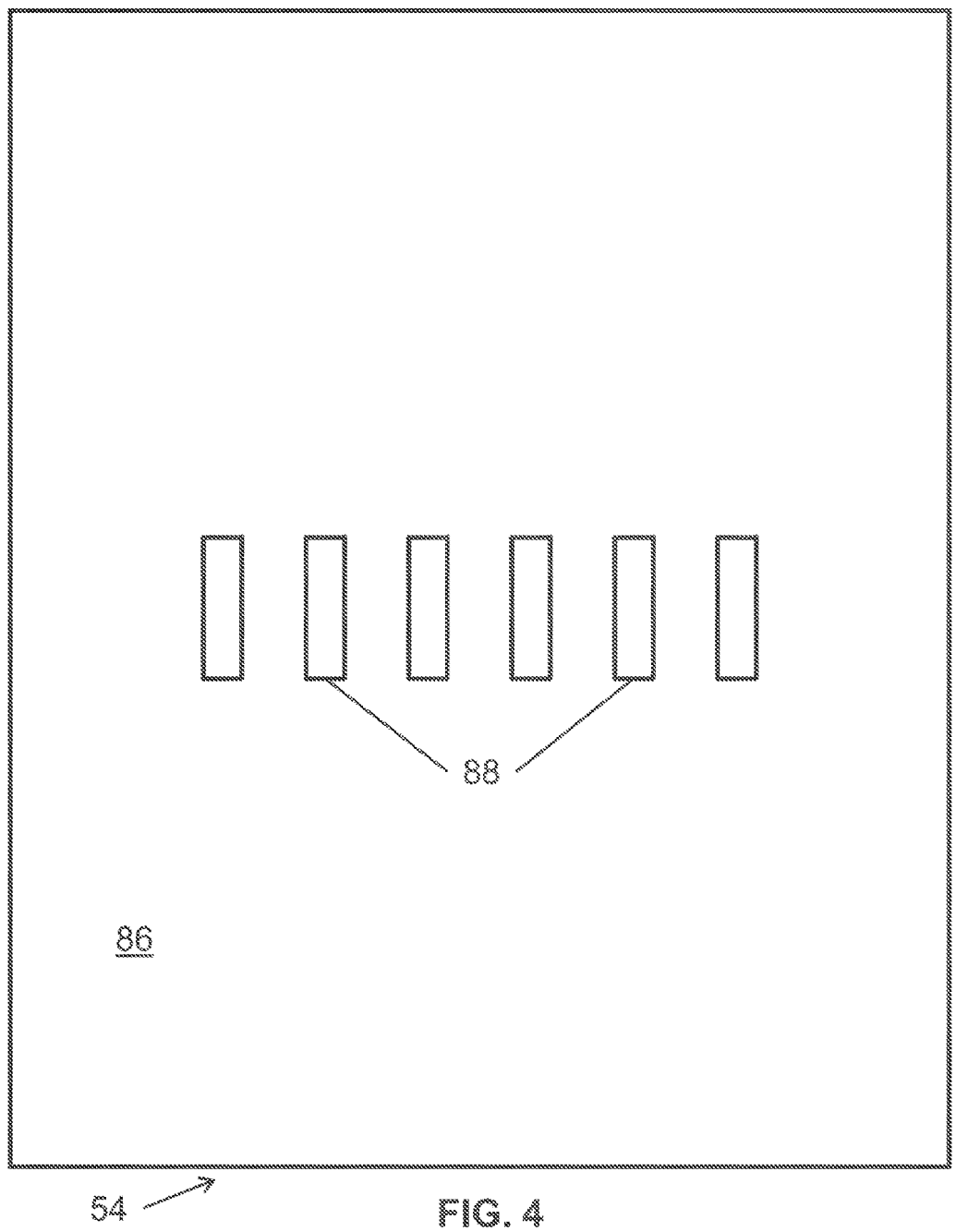
FIG. 4 is a view of a rear surface of the sports board drill training apparatus implementation of FIG. 3.

Referring to FIG. 4, implementations of training apparatuses 54 may include a rectangular housing that contains the internal circuitry (memory, microprocessor, wiring, etc.) with a front surface 58 and a rear surface 86 where the width of the housing is less than the smallest dimension of the front surface 58. As illustrated, the rear surface 86 may include one or more switches 88 which can be operated by a player's hand. The one or more switches 88 may be any of a wide variety of types, including, by non-limiting example, flags, pull switches, magnetic switches, lever operated switches, push button switches, toggle, switches, and any other switch type.

Figure 5:
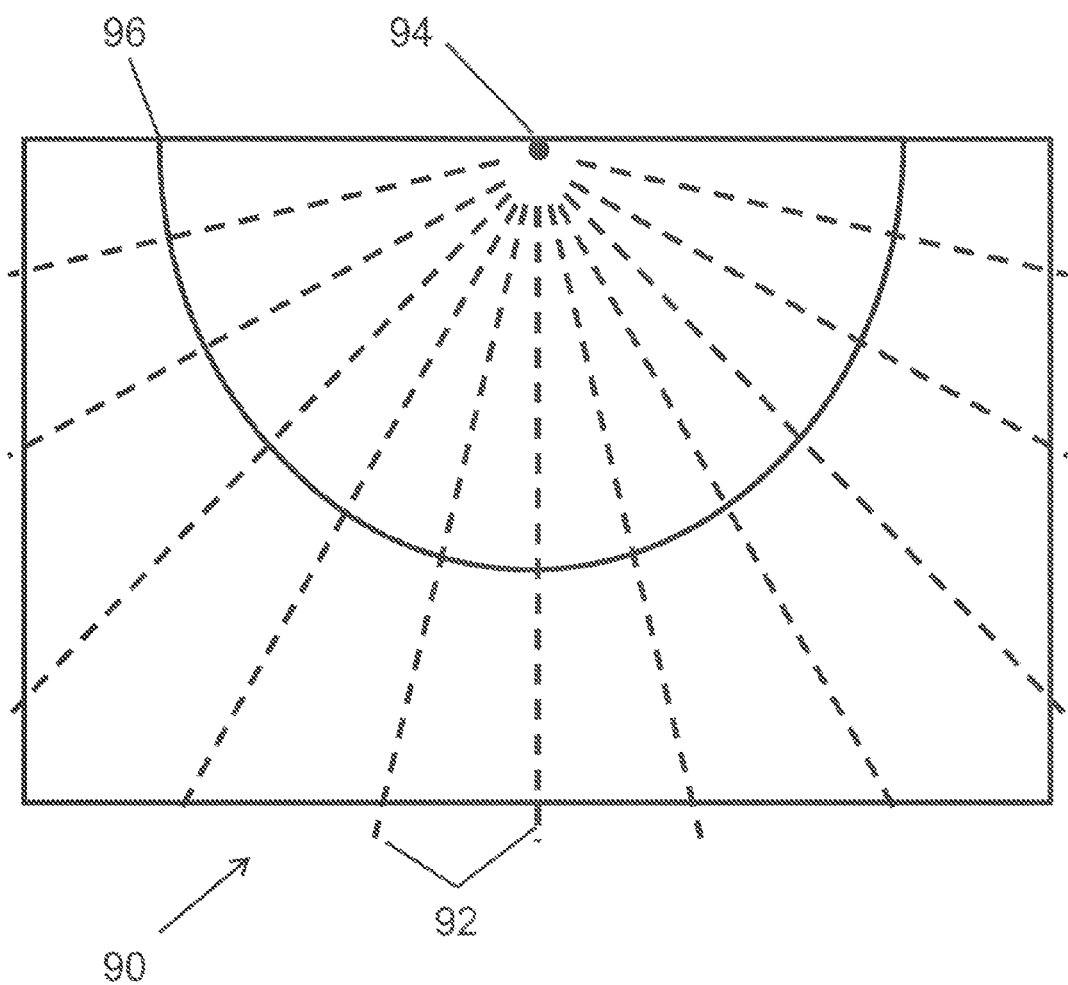
FIG. 5 is a front view of an angle template.

During use of the training apparatus 54, it may be placed at a particular location on a sports venue. In the case where the sports venue is a basketball court, a certain amount of setup may be desired before the training apparatus 54 is used to run training exercises and drills. To help set up the location of particular lanes, implementations of training apparatuses 54 may include an angle template 90, an implementation of which is illustrated in FIG. 5. As illustrated, the angle template 90 includes a plurality of angle lines 92 centered on a point 94 corresponding with a basketball hoop. An arc 96 is also included indicating the position of the three point line on the basketball court. The plurality of angle lines 92 may be equally spaced from each other and from the side of the angle template 90 that includes the point 94 corresponding with the basketball hoop. For a basketball implementation, the angle lines may be spaced from each other about 15 degrees. When used, the angle template 90 is used to set the proper location of one or more cones on the surface of the basketball court that are used to indicate the location of one or more lanes being used during a training game. When used in conjunction with a tape measure to measure the distance between the training apparatus 54 and the basketball hoop, the angle template 90 allows the players to ensure that training apparatus 54 and cones are setup to correspond with the various lane configurations programmed into the games stored in the training apparatus 54.

Figure 6:
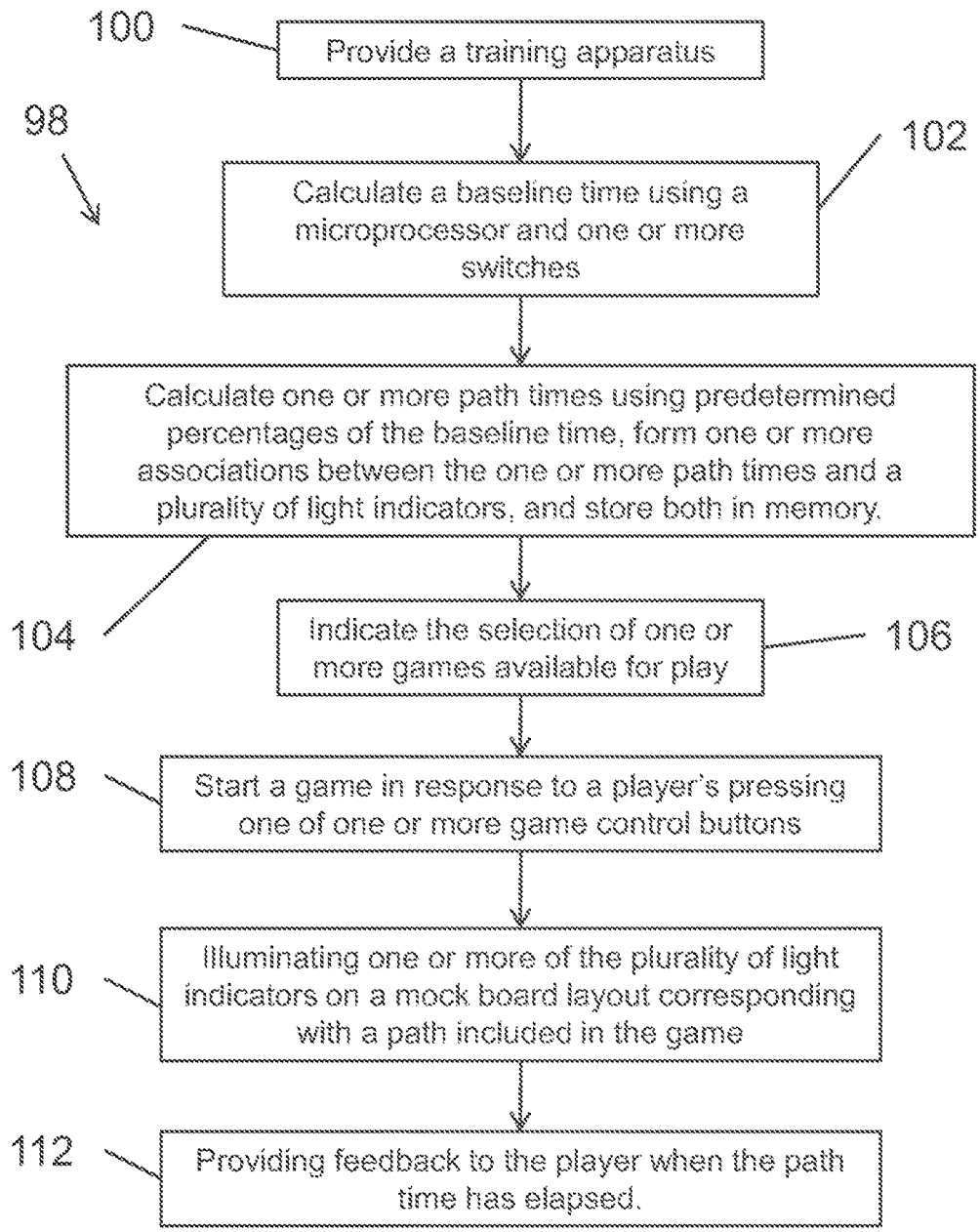
FIG. 6 is a flowchart of an implementation of a method of playing a sports training game.

Referring to FIG. 6, implementations of training apparatuses 11, 54 like those disclosed in this document may utilize an implementation of a method of playing a sports training game 98. As illustrated, the method may include providing a training apparatus (step 100), which may be placed at many different locations at a particular sports venue, which could be any venue identified in this document. The method also includes calculating a baseline time using a microprocessor and one or more switches (step 102). This part of the method 98 may be take place in a wide variety of ways. In particular implementations, the method may be that a player starts the timing clock, runs/walks/swims/etc. to a predetermined location on the sports venue, and then activates the one or more switches on the rear surface of the training apparatus to send a switch open signal to the microprocessor. The microprocessor calculates the baseline time as the number of seconds between the starting of the clock and the receipt of the switch open signal. In implementations where the timing clock independently tracks the time, the switch open signal may stop the clock and the timing clock may report the recorded time to the microprocessor directly; in other implementations, the timing clock may be included in the microprocessor and activated by a signal from a game control button, and then stopped by receipt of the switch open signal; in these implementations, the microprocessor itself is tracking the elapsed time. Because it is the particular player using the training apparatus who starts, runs (walks, etc., according to the particular sport) and opens the switch on the back of the training apparatus, the baseline time calculated corresponds with that player's abilities, and the training apparatus then has a player-specific speed-related value to use when developing games that contain training exercises.

In particular implementations, one or more baseline distribution tables may be stored in memory associated with the microprocessor which are calculated and/or designed using a professional skilled athlete's performance. The baseline time calculated for the particular player may be compared with a corresponding baseline time from the one or more baseline distribution tables and visual and audio feedback provided may be based on the comparison between the baseline time and the corresponding baseline time from the one or more baseline distribution tables. In this way, in various implementations, the feedback may represent that coming from a coach experienced in coaching professional athletes in the particular sport.

The method 98 also includes calculating one or more path times using predetermined percentages of the baseline time, forming one or more associations between the one or more path times and a plurality of light indicators, and storing them in memory (step 104). Because the various paths that contain the training exercises that may be included in a particular game may vary in distance or in the time it takes to complete a particular training exercise, the time a player should take to complete a given path may be calculated as a percentage of the baseline time, though other calculations, such as, by non-limiting example, averages, standard deviations, ratios, target values, ratios of target values to actual values, or any other method of approximating a desired time period could be used. Since the baseline time may represent the particular speed of a player, asking the player to complete a shorter path in a smaller amount of time that the baseline time would continue to challenge the player, and vice versa. The percentages used may be preset and stored in the memory of the training device as non-user editable values or may be user configurable or automatically or manually determined in particular implementations. The resulting one or more path times that result from calculating with the percentage(s) is then stored in the memory for retrieval.

The method 98 also includes indicating the selection of one or more games available for play (step 106). This may be accomplished using the one or more game indicators and/or the timer clock to show which of the stored games is available for selection or is currently selected. The game control buttons may be involved in switching which game is indicated on the game indicators and/or timer clock. The method 98 also includes starting a game in response to the player's pressing a game control button that has been configured to begin a game sequence with the microprocessor (step 108). The method 98 includes illuminating one or more of a plurality of light indicators on a mock board layout corresponding with a path included in the game (step 110). Particular paths may require more than one training exercise to be carried out along their length, so each of the plurality of light indicators may show a location where a particular training exercise should be performed. In some implementations, a particular light indicator may simply indicate that a player gets to choose any one of several training exercises to complete within a specific period of time. When the mock board layout corresponds with a basketball court, the location of a light indicator may be a shot location, where the player is to take a shot. The method 98 also includes providing feedback to the player when the path time has elapsed (step 112). The feedback may be audible, visual, or tactile (if the training apparatus includes a connection to a wireless tactile feedback device worn by the player) or any combination of the two. The feedback generally comes in various implementations when the time to complete all the training exercises on a given path has expired. When the path is a basketball lane, the player should be able, for example, to complete the shot, whether a layup, free throw, or jump shot prior to the expiration of the time allotted for the particular path. This type of training exercise focuses on footwork, dribbling technique, and proper shooting technique to ensure that the shots are both timely and actually go in the hoop.

A wide variety of variations are possible using the implementations of the method 98. For example, in certain game implementations, the method may include showing the time elapsed since the player pressed the game control button to start the clock on the timing clock, allowing the player to see how long it has taken, or, in other implementations, to see how much time is actually left to complete the training exercise and/or path. Where the time is shown on the timing clock, in particular game implementations, the time may be visible on the clock for a predetermined period (ex. 2 seconds) before the timing clock is darkened, leaving the player to internally count down while attempting to complete the particular training exercise(s) or path, since the predetermined period of time is less that the path time calculated for completion of the path. When basketball is being played, this particular implementation may be useful to help players develop their internal timing so that they can complete a shot prior to expiration of the shot clock without having to look at the shot clock.

In particular implementations, the feedback provided to the player may be comparative and involve the difference in time elapsed between a first path completed and a second path completed in the same or even a different game. In a basketball situation, the first path could be a layup on the right side and the second path could be an identical layup. In another situation, the first path could be a layup on the right side and the second path could be a layup on the left side—in this situation, the player can assess and work on reducing the effect of right or left handedness on his or her speed and/or accuracy. In other situations, the first path could be running without the basketball and the second path could be running while dribbling the ball. In this situation, the difference in times indicates how much dribbling is slowing a particular player down, and the player can use various training exercises to improve dribbling speed. The saving of historical information either on the training apparatus itself or on a Universal Serial Bus (USB) flash drive coupled into a USB port coupled to the memory and microprocessor of the training apparatus may also allow the first path to be a previously executed path and the second path to be a newly completed path so the player can gauge his or her progress. In some implementations, the feedback can include informing the player when a path time corresponding to when a professional player completed the path has elapsed, allowing the player to compare his or her current times at various training exercises (dribbling, shooting, running, etc.) with professional level times. A wide variety of possibilities and games can be constructed using the principles disclosed in this document including, by non-limiting example, single player games, multi-player games, head-to-head player games, skills testing games (i.e, the game of horse in basketball), and any other game involving a training exercise for a particular sport.

In any of the method implementations disclosed herein, the use of advancing speeds for each training exercise(s) may be utilized. For example, the method may involve indicating that a player is to complete a layup along a particular path. After the player has completed the layup within the time allotted, the method may involve reducing the path time for that particular path or all paths to enable the player to be challenged by needing to complete various training exercises (or the same exercise) at an ever faster pace. The use of advancing speed may be a component of all method implementations and games or one or some of the implementations or games.

Figure 7:
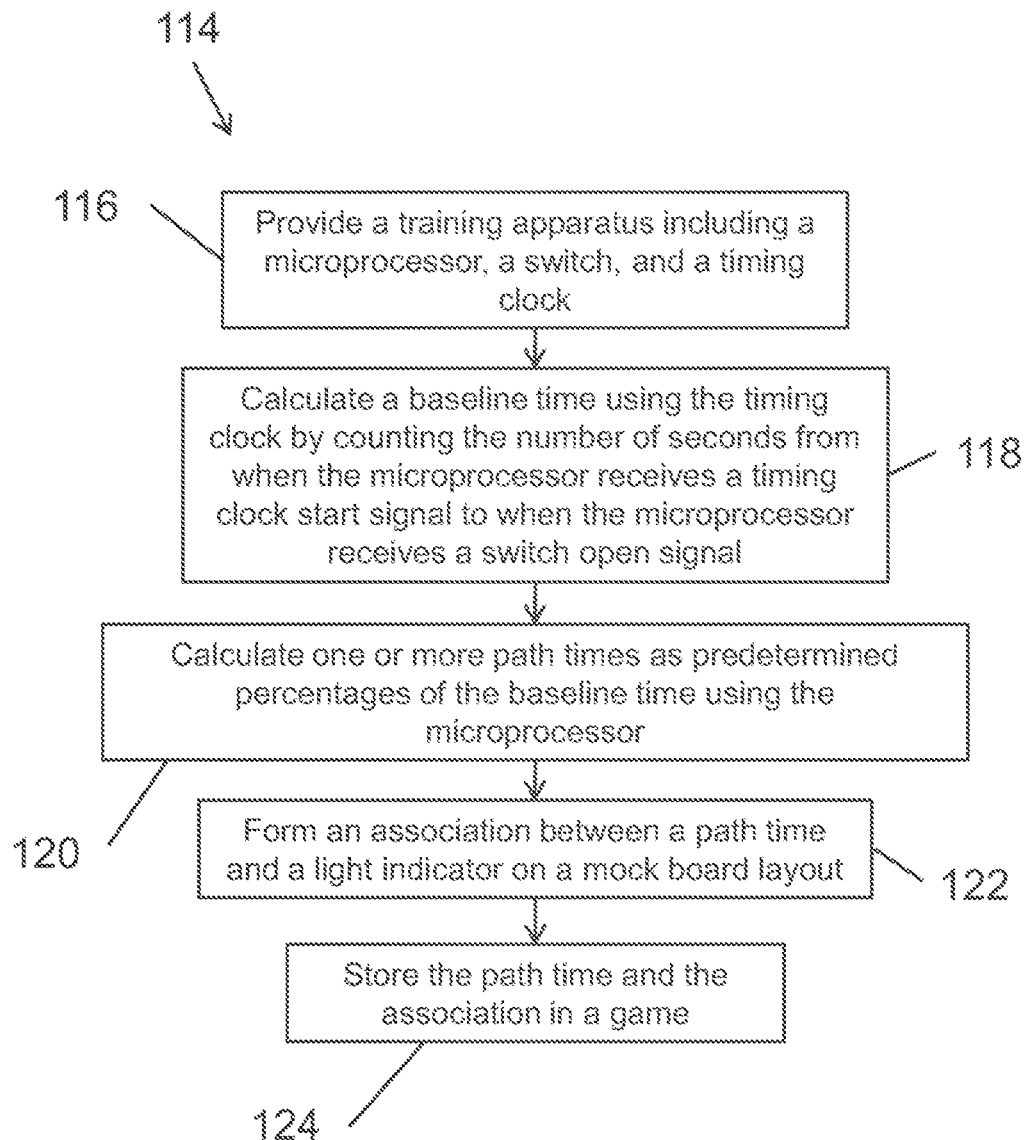
FIG. 7 is a flowchart of an implementation of a method of calculating a baseline time for a sports training game.

Referring to FIG. 7, implementations of training apparatuses 11, 54 like those disclosed in this document may utilize implementations of a method of calculating a baseline time for a sports training game 114. As illustrated, the method 114 includes providing a training apparatus including a microprocessor, a switch, and a timing clock (step 116) and calculating a baseline time using the timing clock by counting the number of seconds from when the microprocessor receives a timing clock signal to when the microprocessor receives a switch open signal (step 118). The method also includes calculating one or more path times as predetermined percentages of the baseline time using the microprocessor (step 120), forming an association between a path time calculated and a light indicator on a mock board layout (step 122), and storing the path time and the association with the light indicator in memory associated with a particular game or games (step 124). As with the previously discussed method 98, implementations of the method 114 may be carried out by having a particular player start the timing clock, complete a specified path, and open one of the switches on the back surface of the training apparatus or on another surface of the apparatus. The elapsed time then sets a baseline for player performance that can be used to develop a set of path times for specific training exercises. Implementations of the method 114 may be utilized in any of a wide number of sports for which training apparatuses have been constructed, including squash and basketball as described herein.

In places where the description above refers to particular implementations of training apparatuses and related method implementations, it should be readily apparent that a number of modifications may be made without departing from the spirit thereof and that these implementations may be applied to other training apparatuses and related method implementations.

The invention claimed is:

1. A sports board training apparatus comprising:
a front surface and a rear surface, the front surface comprising a mock board layout comprising a top side and a bottom side, the top side adjacent to a basketball hoop indicator and opposing the bottom side and a three point arc extending from the top side and enclosing a key comprising an arc intersecting with the three point arc at a top of the key point, the arc centered on the three point arc and further comprising a free throw line connecting each end of the arc and two lines extending from each end of the arc that intersect the top side substantially perpendicularly, the basketball hoop indicator substantially centered between the two lines;
a plurality of lights mounted thereon at locations on the mock board layout corresponding to a plurality of shot locations;
a timing clock mounted above the top side of the mock board layout;
one or more game control buttons mounted on the mock board layout;
one or more timing clock stop switches mounted on the rear surface of the sports board training apparatus; and
a microprocessor adapted to actuate each of the plurality of lights, receive inputs from the one or more game control buttons, and receive signals from one or more switches;
wherein the microprocessor, the plurality of lights, the timing clock, and the one or more switches are electrically coupled with an electrical power supply.

2. The sports board training apparatus of claim 1, further comprising one or more game indicator lights mounted adjacent to the one or more game control buttons and electrically coupled with the electrical power supply.

3. The sports board training apparatus of claim 1, wherein the mock board layout is coupled to an angle template, the angle template comprising a plurality of angle lines and adapted to allow a player using the plurality of angle lines to place one or more cones on a basketball court with a layout corresponding with the mock board layout at aligned locations.

\* \* \* \* \*